W. F. ZEITLER.
TIRE PROTECTOR.
APPLICATION FILED JULY 5, 1916.
1,262,154.
Patented Apr. 9, 1918.
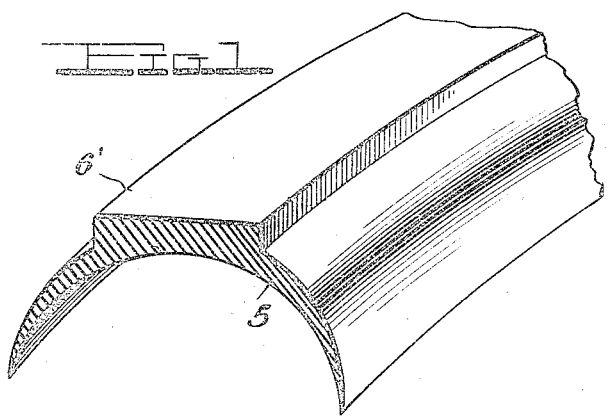
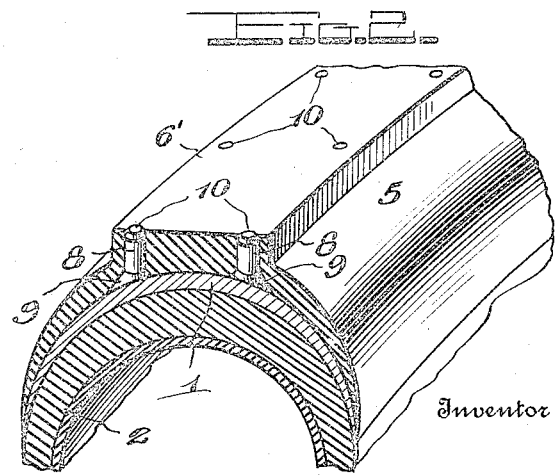
Witness
Chas. L. Griesbauer
Inventor
William F. Zeitler,
By William E. Baff,
Attorney

UNITED STATES PATENT OFFICE.

WILLIAM F. ZEITLER, OF WASHINGTON, DISTRICT OF COLUMBIA.

TIRE-PROTECTOR.

1,262,154. Specification of Letters Patent. Patented Apr. 9, 1918.

Application filed July 5, 1916. Serial No. 107,580.

*To all whom it may concern:*

Be it known that I, WILLIAM F. ZEITLER, a citizen of the United States, residing at Washington, District of Columbia, have invented certain new and useful Improvements in Tire-Protectors, of which the following is a specification.

This invention relates to improvements in tire protectors for wheels. One of the objects of my invention is to provide a tire protector which will make the tire puncture proof thereby contributing to its increased life and preserving its durability.

Another object of my invention is to provide a protector for inflatable tires so constructed that it may also serve to prevent the skidding of the wheels.

A further object of my invention is to provide an arrangement of tire protector which allows for the flexing of the tire in the regular manner but which covers the tire by means of a resilient annular member or band.

Furthermore it is the express purpose of my invention to provide an endless resilient protector for tires which has extending circumferentially around it a solid rubber or cushion band adapted to increase the tractive power of the resilient metal band as well as of the wheel so as to minimize tht likelihood of blow-outs and other accidents to inflatable tires.

And another object of my invention is to provide an endless resilient tire-protecting band with a series of pointed projections adapted to be embedded into the solid rubber band encircling said metal band for the purpose of preventing the marginal edges of the tread portion from wearing out unevenly and unequally with respect to other parts of the tread.

With the above and other objects in view my invention consists of the combination, arrangement and details of construction fully disclosed in the specification and drawings and then more particularly pointed out in the appended claims.

In the drawings, wherein similar reference characters designate similar parts throughout the respective views Figure 1 is a section of the outer rubber tire tread, to be described, and Fig. 2 is a sectional view of my invention, showing the assembly of the protector band, the rubber tread, and the pneumatic tire.

In the drawings which are merely illustrative of my invention, I have illustrated certain devices now known to me as adapted to carry out the principle of my invention. While the tire of the wheel is deflated I take a preferably seamless metal resilient band 1 of a suitable diameter and fit it around the deflated tire 2 of a wheel. When air is pumped into the tire 2 so as to inflate and expand it the tire presses against the annular concave side of the band 1 which latter is made of such a configuration in cross-section as will adapt it to conform to the tread and sides of the tire.

Arranged to snugly extend circumferentially around the metal resilient band 1 is an outer solid rubber band or cushion designated broadly 5 made of such a diameter and shape so as to be nicely configured to the convex side of the concavo-convex steel tire protector band 1, and this cushion is stretched tightly around the band 1 so as to cause it to remain snugly in position over the protector band.

It is within the principle of my invention to vary the shape of this outer rubber band or cushion, the function of which is primarily to increase the tractive power of the steel band and in a measure to make this cushion band serve as a means for preventing the skidding of the wheel. However, I have found as a result of considerable experimentation with steel protector bands having rubber cushions on them of various kinds that the very best and most satisfactory results can be obtained by providing the cushion band 5 with a central tread portion having its outer surface 6' formed concentrically with respect to the axle of the wheel.

Great difficulty has heretofore been experienced in making the outer cushion or solid rubber band of a wheel wear away uniformly so as not to cause a bad tractive effect on the part of the tread portion of this band. The question is how to shape and arrange this cushion band around the circumference of the wheel so as to distribute the wear uniformly upon the tread thereof and at the same time to increase the purchase and tractive power of the wheel. Where it has been proposed before to make the cushion band convex at its tread portion the severest wear took place at the center of the convex portion of the band and this shape of tread did little to increase the traction of the wheel. And where the tread was flattened out so as to increase the surface exposed for engagement with the roadbed the insuperable difficulty encountered was to prevent the uneven and unequal wearing away of the marginal edges of the rubber band or at least to prevent the marginal edges from twisting and curling to the detriment of the effective tractive power of these portions. In the course of my experiments with this problem I have found the solution to lie in the use of such a device as is illustrated in Fig. 2.

I have tried out a tire protector having an outer solid rubber band with a central portion concentric with the axle of the wheel and have found it reliable and conducive to an equal distribution of the wear upon the tread of this band as it is this portion which receives the greatest wear and pressure of the wheel.

In this Fig. 2 a series of studs 8 are preferably formed with curved base flanges 9 the latter being secured in any desirable manner upon the convex side of the steel band 1, and their studs penetrate the solid rubber band 5 of the tread. The heads 10 of these studs are preferably formed conical and have their outer faces arranged flush with the tread of the band 5. It will be noted that there are preferably two circumferential series of these studs, each flanking one of the two side margins or marginal edges of the tread 6' of the band 5, the tread 6' being, as already described concentric with the axle of the wheel,—and the arrangement is such as to cause the axes of these studs to be disposed parallel with the side walls of said tread as shown in Fig. 5. These studs are made of such a length and are so positioned upon the steel protector band 1 as will dispose their outer faces so as to flatly engage the roadbed and it will be seen that they tend to prevent the rapid wearing away of these marginal edges of the tread 6', which form corners with the side portions of the solid rubber band 5. It will be seen also that these studs wear away in the course of time together with the band 5 and not only hold the latter against displacement from the band 1, but serve in the nature of anti-skid projections to prevent the slipping of the wheel.

Numerous modifications may be resorted to in practice without departing in principle from the details of construction herein disclosed.

What I desire to claim protection on is:—

1. In combination, a wheel, a pneumatic tire mounted upon said wheel, a metallic band fitting around said tire, an annular solid rubber tread fitting snugly around said band, said rubber tread having its inner surface cross-sectionally curved and an outer cylindrical surface, two circumferentially extending series of studs being secured upon the tread portion of said band and having their outer portions disposed flush with the outer surface of said solid rubber tread.

2. In a device as described, in combination, a wheel having an axle, a pneumatic tire on said wheel, a metallic band, concavo-convex in cross-section fitting around said metallic tire, a solid rubber protector tread fitting snugly around said protector band, a rubber annular portion formed upon said tread having side walls disposed perpendicularly and its outer surface disposed at right angles to said side walls, and two circumferentially-extending series of rigid studs, said studs having enlarged base portions curved upon their outer faces and secured against the curved sides of said tread, and also having shanks penetrating said mentioned annular rubber portion, said shanks being positioned along the side walls of said portion so as to hold the latter up against curling, and so that their outer ends may be flush with the outer portion of the tread.

In testimony whereof I have affixed my signature in presence of two witnesses.

WILLIAM F. ZEITLER.

Witnesses:
WILLIAM E. BAFF,
WILLIAM H. DE LACY.